United States Patent
Rauscher

(10) Patent No.: US 12,322,237 B2
(45) Date of Patent: Jun. 3, 2025

(54) METHOD FOR CLASSIFYING A BANKNOTE, CLASSIFICATION DEVICE, METHOD FOR PRODUCING A CLASSIFIER AND USE FOR THE CLASSIFICATION OF A BANKNOTE

(71) Applicant: GIESECKE+DEVRIENT CURRENCY TECHNOLOGY GMBH, Munich (DE)

(72) Inventor: Wolfgang Rauscher, Parkstetten (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 156 days.

(21) Appl. No.: 17/925,276

(22) PCT Filed: May 10, 2021

(86) PCT No.: PCT/EP2021/025176
§ 371 (c)(1),
(2) Date: Nov. 14, 2022

(87) PCT Pub. No.: WO2021/228433
PCT Pub. Date: Nov. 18, 2021

(65) Prior Publication Data
US 2023/0162553 A1    May 25, 2023

(30) Foreign Application Priority Data
May 14, 2020    (DE) .......................... 102020002902.7

(51) Int. Cl.
*G07D 7/1205*    (2016.01)
*B42D 25/29*    (2014.01)

(52) U.S. Cl.
CPC ........... *G07D 7/1205* (2017.05); *B42D 25/29* (2014.10)

(58) Field of Classification Search
CPC ...... G07D 7/1205; G07D 7/205; B42D 25/29; G01N 21/6408
(Continued)

(56) References Cited

U.S. PATENT DOCUMENTS

| 4,365,153 A | 12/1982 | Seigel et al. |
| 4,949,237 A * | 8/1990 | Brich ............... G05B 21/02 700/89 |

(Continued)

FOREIGN PATENT DOCUMENTS

| DE | 10238568 A1 | 3/2004 |
| DE | 102011055272 A1 | 5/2013 |
| EP | 3605067 A1 | 2/2020 |

OTHER PUBLICATIONS

German Search Report from corresponding German Application No. 10 2020 002 902.7, Dec. 21, 2020.
(Continued)

*Primary Examiner* — Md M Rahman
(74) *Attorney, Agent, or Firm* — Workman Nydegger

(57) ABSTRACT

A method for classifying a banknote has at least one luminescent feature, in which the following steps are carried out: a) exciting the luminescent feature; b) recording at least a first intensity value of the excited luminescent feature at a first time and a second intensity value at a second time that is different from the first time; c) determining a decay time of the luminescent feature by approximate integration over the intensity values between the first time and the second time; d) comparing the determined decay time with a reference decay time of the luminescent feature; and e) classifying the banknote based on the comparison.

12 Claims, 1 Drawing Sheet

(58) Field of Classification Search
USPC .......................................................... 356/71
See application file for complete search history.

(56) References Cited

U.S. PATENT DOCUMENTS

| 9,316,585 | B2 | 4/2016 | Liebsch |
| 2013/0153789 | A1 | 6/2013 | Smith et al. |
| 2014/0306125 | A1 | 10/2014 | Liebsch |
| 2021/0116370 | A1 | 4/2021 | Sato et al. |

OTHER PUBLICATIONS

International Search Report from corresponding PCT Application No. PCT/EP2021/025176, Aug. 12, 2021.

\* cited by examiner

METHOD FOR CLASSIFYING A BANKNOTE, CLASSIFICATION DEVICE, METHOD FOR PRODUCING A CLASSIFIER AND USE FOR THE CLASSIFICATION OF A BANKNOTE

BACKGROUND

The present invention relates to a method for classifying a banknote having at least one luminescent feature. Further, the present invention also relates to a classification device for executing a corresponding method, as well as a method for producing a classifier for classifying a banknote and a use for the classification of a banknote.

To secure banknotes, introduced or applied luminescent substances formed as luminescent markers or luminescent features are normally used that can be machine-detected with sensors, and whose presence can be used for a proof of authenticity.

Oftentimes, not only the presence of luminescent substances is checked, but also their decay behavior. In this way, the counterfeit security can be further increased. It is considered that the more precisely the decay behavior can be determined, the more tightly the thresholds, e.g. fake or authentic, can be set when checking the banknote and the higher the counterfeit security is.

A further advantage is that luminescent substances having, apart from the decay time, identical properties can be used as different and distinguishable security features. Thus, for example, multiple sorting classes can be defined. Moreover, the number of available security features increases. It is considered that the more precisely the decay behavior can be determined, the more different security features can be defined.

To establish the decay behavior, the banknote is normally illuminated with an illuminating flash and, in this way, the luminescent feature is excited. Subsequently, the intensity of the resulting luminescence is recorded at a finite number of different times. In this way, a temporally discretely sampled decay curve consisting of multiple intensity values is obtained as a dataset.

In known banknote processing machines, during checking, banknotes are quickly moved past a fixed sensor, for example at speeds of up to 12 m/s. As a result, the signal-to-noise ratio of the measured decay curve is worse than in a laboratory measurement with a comparatively long measuring period.

To date, known methods are either fast but sensitive to noise, such as determining the decay time using the first derivative of the intensity value curve, or slow and less sensitive to noise, such as determining the decay time using a nonlinear fit.

SUMMARY

It is the object of the present invention to create a solution to how a banknote having at least one luminescent feature can be classified more quickly and more reliably.

According to the present invention, this object is solved by a method and by a classification device having the features according to the respective independent claims. Advantageous embodiments of the present invention are the subject of the dependent claims.

In one method according to the present invention, a banknote having at least one luminescent feature is classified, especially checked for authenticity. The following steps are carried out:

a) exciting the luminescent feature;
b) recording at least a first intensity value of the excited luminescent feature at a first time and a second intensity value at a second time that is different from the first time;
c) determining a decay time of the luminescent feature by, especially numerical, approximate integration over the intensity values between the first time and the second time;
d) comparing the determined decay time with a reference decay time of the luminescent feature; and
e) classifying the banknote based on the comparison.

Through the method according to the present invention, a banknote can be more quickly and more reliably classified, especially checked for authenticity. It was recognized that the use of an approximate integration, especially a numerical integration, results in the decay time of the luminescent feature being able to be determined quickly and nevertheless precisely despite noise.

Numerical integration, which is occasionally also referred to as numerical quadrature, is an approximate determination of integrals. For example, the determination can be done through a quadrature method.

Often, integrals cannot be solved in closed form because no antiderivative can be specified for the integrand, or it is given only by discrete values, for instance measurements, such as the determined intensity values. Then an attempt is made to determine approximate values.

The luminescent feature is formed, for example, from at least one rare earth that, for example, is introduced into an inorganic host lattice as a dopant. Also luminescent features in the form of organic or metallorganic substances, for example metallorganic rare earth complexes, are suitable for the present invention. The banknote especially comprises multiple different luminescent features.

The luminescent feature is excited especially by exposure, preferably by so-called light flashes.

The first intensity value and/or the second intensity value is formed as a luminescence intensity value. Here, the recorded intensity values or luminescence intensity values are a measure of the intensity of the luminescence of the excited luminescent feature, for example at a stipulated wavelength or spectrally integrated over a stipulated wavelength range. Instead of luminescence intensity value, intensity value is written as an abbreviation.

The first intensity value and/or the second intensity value is especially recorded with a photodetector and converted into a voltage signal. Said voltage signal is digitalized, for example in an analog-to-digital converter, and provided to an evaluation unit, for example a microprocessor, as a digital input signal. The steps c) of determining a decay time, d) of comparing with a reference decay time and e) of classifying are especially carried out by the evaluation unit using the digitalized intensity values.

The decay time is a metric that describes the decay behavior of the luminescent feature. The decay time is preferably a temporal value, for example 100 ms. Such a temporal value enables the direct comparison of measurement results of different sensors. In particular, the temporal value is thus at an advantage, for example compared with a dimensionless quotient, since no direct comparison of measurement results of different sensors is possible with the dimensionless quotient.

The reference decay time is preferably assigned to the luminescent feature and can, for example, be provided from a collection of multiple reference decay times.

Through the comparison, especially the similarity of the decay time to the reference decay time is determined. In the event that the decay time matches the reference decay time, for example within, for example predetermined, tolerance limits, the banknote is assigned, for example, to an "authentic" class or an "inauthentic" class.

Additionally or alternatively, an inauthenticity, i.e. counterfeiting, of the banknote can also be recognized if there is no match or if the similarity lies outside the tolerance range. The banknote is assigned, for example, to an "inauthentic" class.

The tolerance range is preferably formed as a predetermined value range. However, the tolerance range can also be only precisely one value such that the decay time must match the reference decay time precisely to fulfill the condition. The reference decay time can also be used in the sense of a threshold value, and the banknote can be assigned to a first class, for example "inauthentic," if the decay time falls below the reference decay time, and assigned to a second class, for example "authentic," if the decay time exceeds the reference decay time.

Preferably at least five, especially at least ten, intensity values are recorded, and the decay time is determined based on the at least five intensity values. Through the at least five intensity values, the decay time can be determined more precisely and more reliably.

Furthermore, the approximate integration is preferably carried out with the trapezoidal rule, especially with the chord trapezoidal formula. Through the trapezoidal rule, the decay time can be determined reliably and quickly.

It is preferably provided that, prior to the determination of the decay time, any noise of the intensity values is reduced, preferably removed. The noise can be reduced, for example, through a smoothing filter. This is advantageous since, in this way, the decay time can be determined more precisely.

Furthermore, it is preferably provided that the noise of the recorded intensity values is reduced by a moving average across multiple of the intensity values, especially at least three intensity values. Through the moving average, the noise can be reduced particularly efficiently.

Furthermore, it is preferably provided that the moving average is determined across at least five intensity values, especially across at least six intensity values. Through the use of at least five intensity values, the noise can be reduced and the signal maintained as close to the origin as possible.

Furthermore, it is preferably provided that a third intensity value of the excited luminescent feature is recorded at a third time that lies between the first time and the second time. It is especially provided that multiple further intensity values are recorded between the first time and the second time. Through the third intensity value, the decay time can be determined more precisely and more reliably.

Furthermore, it is preferably provided that the intensity values are recorded in such a way that a temporal spacing between the first time and the third time and a further temporal spacing between the second time and the third time are identical, that is, are formed to be equidistant. In the event that intensity values are recorded at at least three times, it is preferred that the times are equidistant. Through the identical temporal spacings, the decay time can be determined more easily and thus more quickly. Through the identical temporal spacings, the trapezoidal rule can be carried out particularly effectively.

Furthermore, it is preferably provided that the decay time is determined based on the trapezoidal rule, especially based on the chord trapezoidal formula or based on the tangent trapezoidal formula or midpoint rule, in which the tangent at the midpoint of the interval is applied to the function. Through the trapezoidal rule, the decay time can be determined more quickly, since the trapezoidal rule provides an approximation that is precise and reliable for the application. With the trapezoidal rule, the area under the curve is replaced, in the given interval, with a trapezoid or multiple trapezoids having identical widths.

Furthermore, it is preferably provided that the first intensity value is recorded only after a predetermined waiting time after the excitation of the luminescent feature. Through the waiting time, the enhancement phase of the luminescent feature and the excitation light can be masked from the decay curve. Furthermore, through suitable choice of the waiting time, a sub-section of the decay curve can be selected that has a great similarity with the model function on which the classifier is based. As a result, the decay time can be determined more precisely and more quickly.

Furthermore, it is preferably provided that the decay time is determined depending on a normalization value that is formed by subtracting the first intensity value from the second intensity value. Furthermore, preferably by subtracting the first intensity value from the second intensity value, a divisor is formed that is applied to the surface area. Finally, the decay time follows from the division.

The present invention also relates to a classification device, especially an authenticity checking device, for a banknote having at least one luminescent feature. The classification device is adapted to carry out the following steps:
 a) exciting the luminescent feature;
 b) recording at least a first intensity value of the excited luminescent feature at a first time and a second intensity value at a second time that is different from the first time;
 c) determining a decay time of the luminescent feature by approximate integration over the intensity values between the first time and the second time;
 d) comparing the determined decay time with a reference decay time of the luminescent feature; and
 e) classifying the banknote based on the comparison, especially recognizing the authenticity of the banknote in the event that the determined decay time matches the reference decay time within a tolerance range.

The classification device is preferably part of a larger unit, for example a banknote processing device, that is formed, for example, to count and/or to sort banknotes.

The present invention also relates to a method for producing a classifier for classifying a banknote having at least one luminescent feature, in which the following steps are carried out:
 a) exciting the luminescent feature;
 b) recording at least a first intensity value of the excited luminescent feature at a first time and a second intensity value at a second time that is different from the first time;
 c) determining a model decay curve of the luminescent feature based on the intensity values;
 d) determining an antiderivative of the model decay curve;
 e) determining an approximation of the antiderivative; and
 f) providing the approximation as the classifier for classifying the banknote.

Through the method according to the present invention, a classifier for the classification of banknotes can be produced with which banknotes can be more quickly and more reliably classified, especially checked for authenticity. It was recognized that the use of a model decay curve and its antiderivative in producing the classifier results in the decay time of the luminescent feature being able to be determined quickly and nevertheless precisely despite noise.

The model decay curve is selected, for example, from a collection having multiple model decay curves. The selection can be made, for example, based on a previously conducted assignment of the respective luminescent feature to the respective model decay curve.

The model decay curve is especially formed as an exponentially falling curve.

The antiderivative especially makes it possible to determine the surface area under the model decay curve in the stipulated limits, especially between the first time and the second time. The derivative function of the antiderivative especially corresponds to the model decay curve.

It is preferably provided that, in determining the approximation of the antiderivative, only a single piecewise integral is determined. Through the determination of a single piecewise integral, especially between the first intensity value and the second intensity value, the decay time can be determined more quickly than if the decay time is determined using a calculation of multiple piecewise integrals.

The present invention also relates to a use of an, especially numerical, approximate integration for the classification of a banknote having at least one luminescent feature.

The trapezoidal rule, especially the chord trapezoidal formula, is preferably used as the approximate integration.

However, also Simpson's rule or Simpson's ⅜ rule can be used.

The preferred embodiments presented with reference to the methods according to the present invention, and their advantages, apply accordingly to the classification device according to the present invention. The subject components of the classification device according to the present invention are formed to carry out the respective steps of the methods. The advantages of the methods and classification device also apply to the use according to the present invention.

Further features of the present invention are evident from the claims, the drawings and the description of the drawings.

BRIEF DESCRIPTION OF THE DRAWINGS

Exemplary embodiments of the present invention are explained in greater detail below by reference to a schematic diagram.

Here are shown.

DETAILED DESCRIPTION OF VARIOUS EMBODIMENTS

Figure 1:
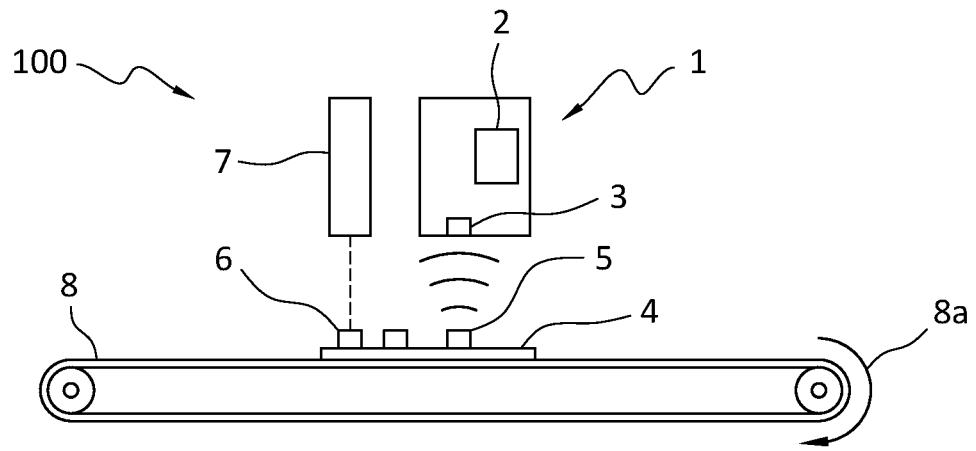
FIG. 1 a schematic diagram of an exemplary embodiment of a classification device according to the present invention.

In the drawings, identical or functionally identical elements are labeled with identical reference signs.

FIG. 1 shows an exemplary embodiment of a classification device 1. The classification device 1 is formed to classify banknotes, and according to the exemplary embodiment, part of a banknote processing device 100.

The classification device 1 comprises an evaluation unit 2, for example a microprocessor, and a recording unit 3, for example a photodetector.

Also shown is a banknote 4 having a luminescent feature 5 and multiple further luminescent features 6.

Further shown is an excitation unit 7, especially an illumination unit or light flash unit, and a transport unit 8 having direction of travel 8a.

The transport unit 8 is formed to transport the banknote 4 from the excitation unit 7 to the recording unit 3.

The excitation unit 7 is formed to excite or charge the luminescent feature 5 and/or the further luminescent features 6, especially with light.

After the excitation, the luminescent feature 5 and/or the further luminescent features 6 gradually emit the charged energy in the form of luminescent light. That is, the luminescent features 5, 6 luminesce, i.e. the luminescent features 5, 6 still glow even when said features are no longer illuminated.

The luminescent light emitted by the luminescent feature 5 and/or the further luminescent features 6 after excitation is recorded by the recording unit 3. The recording unit 3 records intensity values, especially at least a first intensity value and a second intensity value, of the luminescent light emitted by the luminescent feature 5 and/or the further luminescent features 6. The recording unit 3 preferably records the intensity values at different times. In this way, interpolation values or interpolation points for the decay behavior of the luminescent feature 5 and/or the further luminescent features 6, especially a decay curve, are recorded.

The intensity values recorded by the recording unit 3 are evaluated in the evaluation unit 2.

Figure 2:
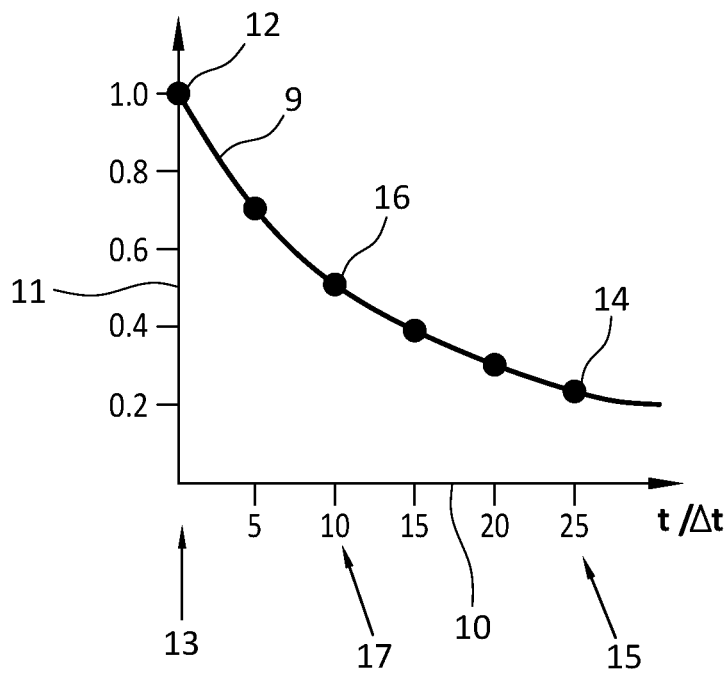
FIG. 2 a schematic diagram of an exemplary embodiment of a model decay curve of a luminescent feature.

FIG. 2 shows an exemplary embodiment of a schematic model decay curve 9. On the ordinate 11 is plotted, on a relative scale, which luminescence intensity of the luminescent feature 5 is recorded. "1.0" means that the maximum luminescence intensity of the luminescent feature 5 is recorded. "0" means that no luminescence of the luminescent feature 5 is recorded, i.e. the luminescent feature 5 is completely discharged. On the abscissa 10 is plotted the time in the unit $\Delta t$. In particular, on the abscissa 10 is plotted the ratio of $t/\Delta t$, i.e. the time since the first time or the first measurement time in multiples of the sampling time interval $\Delta t$.

Furthermore, at least a first intensity value 12 of the luminescent feature 5, which is recorded at a first time 13, and a second intensity value 14 of the luminescent feature 5, which is recorded at a second time 15, are marked in the figure.

Further shown is at least a third intensity value 16 of the luminescent feature 5, which is recorded at a third time 17, and (without a reference sign) further intensity values at further times.

The third time 17 is especially arranged between the first time 13 and the second time 15.

The times 13, 17, 15 are preferably equidistant (not depicted).

The intensity values 12, 14, 16 correspond especially to the luminescence intensity emitted by the luminescent feature 5, which is recorded or measured by the recording unit 3 at the respective time 13, 15, 17.

In the method for producing a classifier, a model decay curve 9 is determined based on the measured intensity values 12, 14, 16. The model decay curve 9 can be expressed, for example, by $y(t)=a \cdot e^{-t/\tau}$, where y is an intensity value at time t, a is a scaling factor that is proportional to the intensity of the luminescent feature, and $\tau$ (tau) is the decay time, for example with the unit s (seconds).

Upon transitioning to the antiderivative Y(T) of the model decay curve y(t), the factor $-\tau$ occurs as a negative decay time:

$$Y(T) := \int_0^T y(t)dt = [-\tau \cdot a \cdot e^{-t/\tau}]_0^T = -\tau \cdot (y(T) - y(0))$$

Thus, for any time T>0:

$$\tau = -\frac{\int_0^T y(t)dt}{y(T) - y(0)} \quad (I)$$

applies. Said formula (I) thus enables a determination of the decay time $\tau$ based on the antiderivative $\int_0^T y(t)dt$ of the model decay curve y(t).

Now let the decay curve of a real banknote be given by the measured values or intensity values $y_i^m = y^m(t_i)$ that were recorded at discrete times $0 = t_0 < \ldots < t_{n-1} = T$. Here, $y^m$ describes the real measurement data, y the model decay curve. Here, the measurement data $y^m$ can deviate from the model decay curve y due to noise, but also systematically. The model decay curve and the time range of the measurement are preferably chosen such that said deviation is minor, then the method enables a particularly precise determination of the decay time. But also for a significant deviation of the measurement data from the model decay curve, for example for non-monoexponential behavior of the measured luminescent feature, the method can advantageously be used and enables a more reliable classification of the banknote.

In the method for producing a classifier, the antiderivative $\int_0^T y(t)dt$ is now, for example, approximately numerically determined from the intensity values $y^m(t_i)$, and said approximation of the antiderivative used for the calculation of the decay time, in the example according to formula (I). The decay time can then be determined with the approximated formula $$\tau = -\frac{\int_0^T y^m(t)dt}{y_{n-1}^m - y_0^m}.$$

For the special case that the measurement times 13, 17, 15 of the intensity values 12, 16, 14 are temporally equidistant with time interval $\Delta t$, according to the trapezoidal rule, for example, approximately $$\int_0^T y^m(t)dt = \Delta t \cdot \left(\frac{1}{2} y_0^m + \frac{1}{2} y_{n-1}^m + \sum_{i=1}^{n-2} y_i^m\right)$$

results, and thus the following formula for determining the decay time ($\tau$) from the intensity values:

$$\tau = -\frac{\Delta t \cdot \left(\frac{1}{2} y_0^m + \frac{1}{2} y_{n-1}^m + \sum_{k=1}^{n-2} y_i^m\right)}{y_{n-1}^m - y_0^m} = \Delta t \cdot \left(\frac{\sum_{i=0}^{n-2} y_i^m}{y_0^m - y_{n-1}^m} - \frac{1}{2}\right) \quad (II)$$

Said formula (II) can be provided and used as a classifier for the classification of banknotes, especially in a method for the classification of banknotes. Alternatively, other model functions or approximations can be used for the integral so as to obtain other classifiers.

With sufficiently many measurement times, the method for the classification of banknotes can be made even more insensitive to noise by smoothing the intensity values 12, 14, 16 prior to the determination of the integral or prior to the classification, and then applying the above formula (II) to the smoothed decay curve or the smoothed intensity values, respectively.

Alternatively, the smoothing can be taken into account in the method for producing a classifier, and the classifier produced in such a way that it comprises a smoothing of the intensity values.

Through the method for the classification of banknotes using a classifier that comprises an approximate integration of the intensity values, the decay time ($\tau$) can be determined more quickly and more precisely. As a result, the banknote 4 can be classified more precisely and more reliably. The counterfeit security of the banknote 4 is increased.

The invention claimed is:

1. A method for classifying a banknote having at least one luminescent feature, in which the following steps are carried out:
    a) exciting the luminescent feature;
    b) recording intensity values of the excited luminescent feature at a first time, at a second time that is different from the first time, and at least one further time between the first and second time;
    c) determining a decay time of the luminescent feature by approximate integration over the recorded intensity values between the first time and the second time;
    d) comparing the determined decay time with a reference decay time of the luminescent feature; and
    e) classifying the banknote based on the comparison.

2. The method according to claim 1, with at least five intensity values being recorded, and the decay time being determined based on the at least five intensity values.

3. The method according to claim 1, with the approximate integration being carried out with the trapezoidal rule.

4. The method according to claim 1, with any noise of the intensity values being reduced prior to the determination of the decay time.

5. The method according to claim 4, with the noise of the recorded intensity values being reduced by a moving average across multiple intensity values.

6. The method according to claim 5, with the moving average being determined across at least five intensity values.

7. The method according to claim 1, with the intensity values being recorded temporally equidistantly.

8. The method according to claim 1, with a first intensity value being recorded at the first time only after a predetermined waiting time after the excitation of the luminescent feature.

9. The method according to claim 1, with the decay time being determined depending on a normalization value that is formed by subtracting a first intensity value at the first time from a second intensity value at the second time.

10. A classification device for a banknote having at least one luminescent feature, the classification device being adapted to carry out the following steps:
    a) exciting the luminescent feature;
    b) recording at least a first intensity value of the excited luminescent feature at a first time and a second intensity value at a second time that is different from the first time;
    c) determining a decay time of the luminescent feature by approximate integration over the recorded intensity values between the first time and the second time;
    d) comparing the determined decay time with a reference decay time of the luminescent feature; and
    e) classifying the banknote based on the comparison.

11. A method for producing a classifier for classifying a banknote having at least one luminescent feature, in which the following steps are carried out:
   a) exciting the luminescent feature;
   b) recording at least a first intensity value of the excited luminescent feature at a first time and a second intensity value at a second time that is different from the first time;
   c) determining a model decay curve of the luminescent feature based on the recorded intensity values;
   d) determining an antiderivative of the model decay curve;
   e) determining an approximation of the antiderivative; and
   f) providing the classifier for classifying the banknote, with the approximation of the antiderivative;
   wherein a single piecewise integral is calculated in determining the approximation of the antiderivative.

12. A method of classifying a banknote having at least one luminescent feature, the method comprising:
   determining an approximate integration of intensity values of the at least one luminescent feature; and
   classifying the banknote;
   wherein the trapezoidal rule is used for determining the approximate integration of intensity values.

* * * * *